(12) United States Patent
Beckman et al.

(10) Patent No.: US 9,737,970 B2
(45) Date of Patent: Aug. 22, 2017

(54) VIBRATORY MASS MEDIA FIXTURE WITH TIP PROTECTOR

(71) Applicant: United Technologies Corporation, Hartford, CT (US)

(72) Inventors: Micah Beckman, Middletown, CT (US); David K. Masiukiewicz, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 38 days.

(21) Appl. No.: 14/903,183

(22) PCT Filed: Jul. 8, 2014

(86) PCT No.: PCT/US2014/045763
§ 371 (c)(1),
(2) Date: Jan. 6, 2016

(87) PCT Pub. No.: WO2015/006332
PCT Pub. Date: Jan. 15, 2015

(65) Prior Publication Data
US 2017/0001280 A1    Jan. 5, 2017

Related U.S. Application Data

(60) Provisional application No. 61/844,698, filed on Jul. 10, 2013.

(51) Int. Cl.
| | | |
|---|---|---|
| *B24B 31/00* | (2006.01) | |
| *F01D 9/04* | (2006.01) | |
| *F01D 25/24* | (2006.01) | |
| *F01D 25/28* | (2006.01) | |
| *B24B 31/06* | (2006.01) | |
| *F04D 29/02* | (2006.01) | |
| *F04D 29/54* | (2006.01) | |
| *F04D 29/64* | (2006.01) | |

(52) U.S. Cl.
CPC .......... *B24B 31/003* (2013.01); *B24B 31/064* (2013.01); *F01D 9/04* (2013.01); *F01D 25/246* (2013.01); *F01D 25/285* (2013.01); *F04D 29/023* (2013.01); *F04D 29/542* (2013.01); *F04D 29/644* (2013.01); *F05D 2220/36* (2013.01); *F05D 2230/10* (2013.01); *F05D 2230/22* (2013.01); *F05D 2250/621* (2013.01); *F05D 2300/516* (2013.01); *Y02T 50/672* (2013.01)

(58) Field of Classification Search
CPC ....... B24B 31/003; B24B 31/064; F01D 9/04; F01D 25/246; F01D 25/285; F05D 2220/36; F04D 29/023; F04D 29/542
USPC ...................................... 451/29, 36
See application file for complete search history.

(56) References Cited

U.S. PATENT DOCUMENTS 2,612,082 A *   9/1952   Angell .................. B23Q 3/063
                                                     164/207
3,482,423 A *  12/1969   Smith ....................... B24C 1/04
                                                      451/29

(Continued)

*Primary Examiner* — George Nguyen
(74) *Attorney, Agent, or Firm* — O'Shea Getz P.C.

(57) ABSTRACT

A fixture assembly includes a frame with a tip rail displaced from a main body. A method of polishing a gas turbine engine component includes restricting a flow of media adjacent to a tip of a component with an airfoil to be generally equal to a flow of media adjacent to a sidewall of the airfoil.

10 Claims, 7 Drawing Sheets

(56) References Cited

U.S. PATENT DOCUMENTS

| | | | | |
|---|---|---|---|---|
| 4,447,992 | A * | 5/1984 | Bergquist | B24B 41/06 451/29 |
| 4,530,861 | A * | 7/1985 | Sippel | B05B 15/045 118/503 |
| 4,569,889 | A | 2/1986 | Przybyszewski | |
| 4,743,462 | A | 5/1988 | Radzavich | |
| 4,914,872 | A | 4/1990 | Snyder | |
| 5,197,191 | A | 3/1993 | Dunkman | |
| 5,209,644 | A | 5/1993 | Dorman | |
| 5,313,700 | A | 5/1994 | Dorman | |
| 5,916,638 | A * | 6/1999 | Zajchowski | B05B 15/045 427/282 |
| 6,049,978 | A | 4/2000 | Arnold | |
| 6,109,873 | A * | 8/2000 | Brooks | B05B 15/045 118/504 |
| 6,520,838 | B1 | 2/2003 | Shaw | |
| 6,821,578 | B2 | 11/2004 | Beele | |
| 7,032,904 | B2 * | 4/2006 | Rogers | F01D 9/04 277/411 |
| 7,043,819 | B1 | 5/2006 | Arnold | |
| 7,361,386 | B2 | 4/2008 | Kim | |
| 8,007,246 | B2 | 8/2011 | Rowe | |
| 8,061,699 | B2 * | 11/2011 | Wang | B23Q 3/061 269/287 |
| 8,105,133 | B2 * | 1/2012 | Jayabalan | B24B 19/14 118/301 |
| 8,266,801 | B2 | 9/2012 | Clark | |
| 8,286,348 | B2 | 10/2012 | Rozic | |
| 8,578,745 | B2 * | 11/2013 | Berndt | B24C 1/04 29/90.7 |
| 8,967,078 | B2 * | 3/2015 | Soucy | B24B 31/00 118/504 |
| 9,511,469 | B2 * | 12/2016 | Boon Beng | B24B 31/12 |
| 9,610,671 | B2 * | 4/2017 | Beckman | B24B 31/003 |
| 2003/0027495 | A1 | 2/2003 | Shaw | |
| 2004/0043231 | A1 | 3/2004 | Tanner | |
| 2006/0021579 | A1 | 2/2006 | Bernaski et al. | |
| 2006/0254681 | A1 | 11/2006 | Mannava et al. | |
| 2007/0107217 | A1 * | 5/2007 | Baus | B24B 31/064 29/889.1 |
| 2011/0068010 | A1 * | 3/2011 | Garimella | B24B 1/04 205/80 |
| 2014/0003951 | A1 * | 1/2014 | Soucy | B29C 67/0077 416/223 A |

* cited by examiner

VIBRATORY MASS MEDIA FIXTURE WITH TIP PROTECTOR

CROSS-REFERENCE TO RELATED APPLICATION

This application claims priority to PCT Patent Application No. PCT/US14/045763 filed Jul. 8, 2014, which claims priority to U.S. Provisional Patent Application No. 61/844,698 filed Jul. 10, 2013.

BACKGROUND

The present disclosure relates to a fixture assembly and, more particularly, to a gas turbine engine airfoil fixture.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor section includes a case circumscribing an engine axis and axially alternating arrays of stationary vanes and rotatable blades. Each vane array may be constructed of multiple vane clusters distributed circumferentially about the interior of the case with each cluster supported by the case. Some vane arrays include clusters of cantilevered vanes.

Precision engineered parts such as gas turbine components may be manufactured by direct metal laser sintering (DMLS) which is an additive metal fabrication technology sometimes also referred to by the terms selective laser sintering (SLS) or selective laser melting (SLM). DMLS components such as stators and rotatable blades are typically final polished with a Vibratory Mass Media (VMM) process. The VMM process submerges the components in a vibrating bed filled with a blend of non-abrasive media and an abrasive paste. Although effective, the VMM process may result in some differences in the desired surface state over the entirety of each component.

SUMMARY

A fixture assembly for a vibratory mass media process is provided according to one disclosed non-limiting embodiment of the present disclosure. The fixture assembly includes a frame with a tip rail displaced from a main body.

In a further embodiment of the present disclosure, the tip rail is arcuate.

In a further embodiment of any of the foregoing embodiments of the present disclosure, the tip rail is defined a predetermined distance from a tip of a component retained by the main body.

In a further embodiment of any of the foregoing embodiments of the present disclosure, a lock plate is included that is mountable to the main body to retain the component.

In a further embodiment of any of the foregoing embodiments of the present disclosure, the component is a vane cluster with a multiple of airfoils.

In a further embodiment of any of the foregoing embodiments of the present disclosure, the tip rail is defined a predetermined distance from a tip of a component retained by the main body.

In a further embodiment of any of the foregoing embodiments of the present disclosure, the predetermined distance is about equal to a distance between each of a multiple of airfoils of the component.

In a further embodiment of any of the foregoing embodiments of the present disclosure, the component is a vane cluster.

A method of polishing a gas turbine engine component is provided according to another disclosed non-limiting embodiment of the present disclosure. This method includes restricting a flow of media adjacent to a tip of a component with an airfoil to be generally equal to a flow of media adjacent to a sidewall of the airfoil.

In a further embodiment of any of the foregoing embodiments of the present disclosure, the method includes utilizing a Vibratory Mass Media (VMM) process for polishing of the gas turbine engine component.

In a further embodiment of any of the foregoing embodiments of the present disclosure, the method includes locating a tip rail a predetermined distance from the tip of the airfoil.

In a further embodiment of any of the foregoing embodiments of the present disclosure, the method includes removably mounting the component to a main body of a frame with the tip rail.

In a further embodiment of any of the foregoing embodiments of the present disclosure, the method includes enclosing a platform of the component.

In a further embodiment of any of the foregoing embodiments of the present disclosure, the method includes positioning the tip rail relative to a multiple of airfoils that extend from the platform of the component a distance about equal to a distance between each of the multiple of airfoils.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
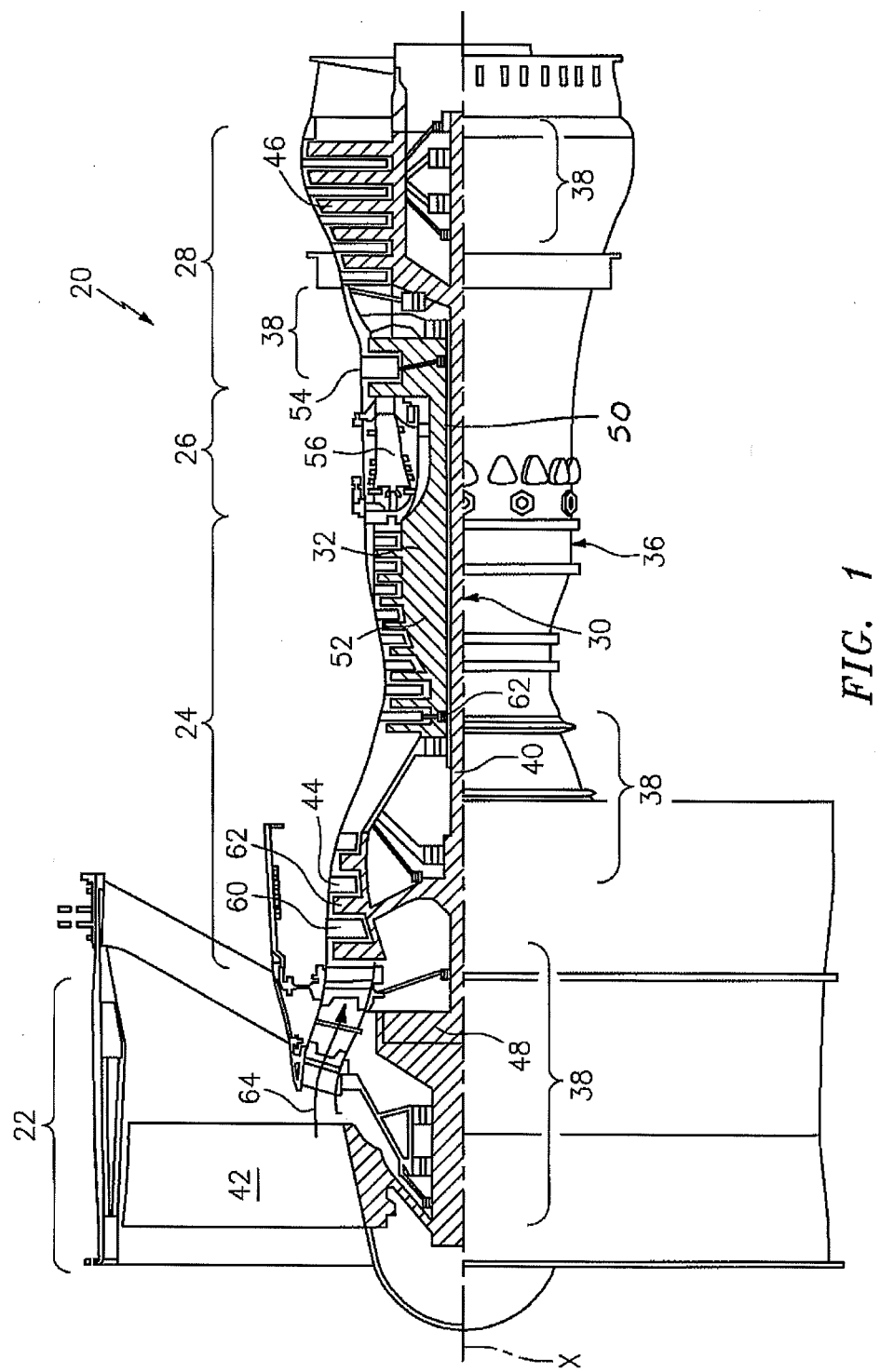
FIG. 1 is a schematic cross-section of an example gas turbine engine.
Figure 2:
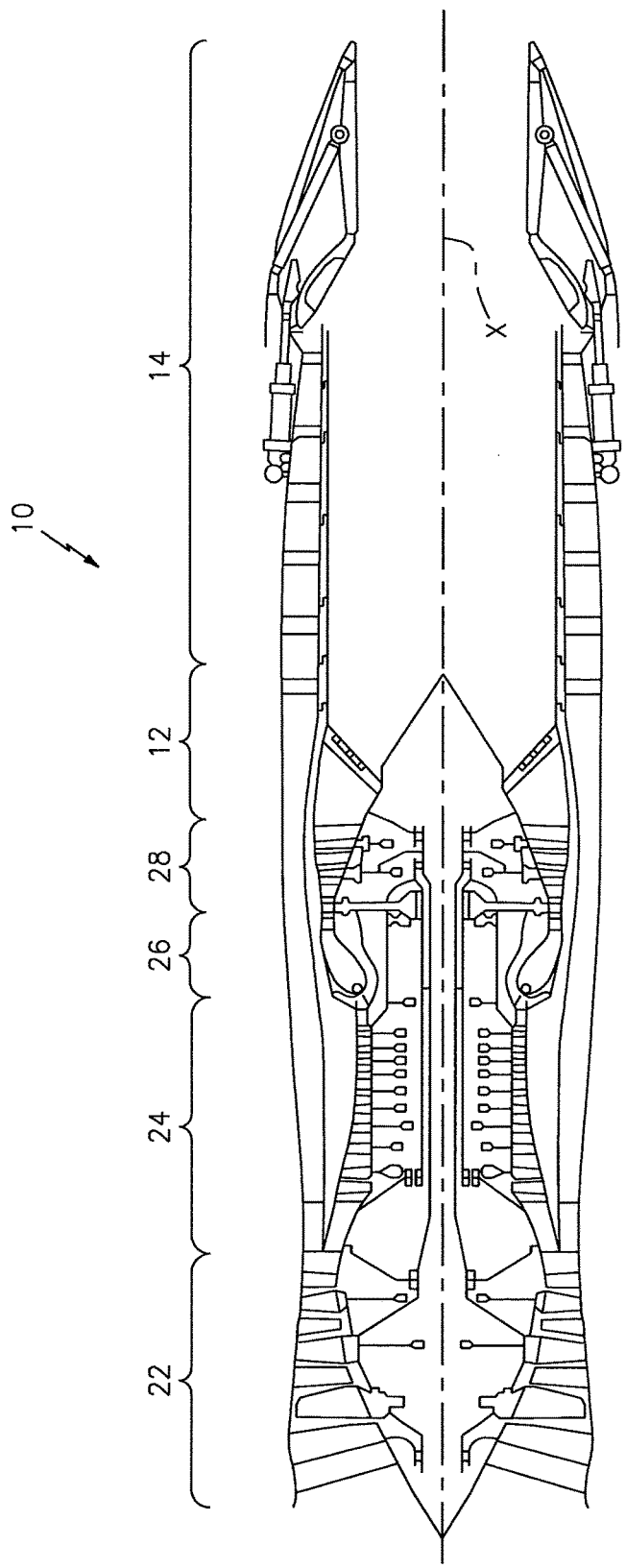
FIG. 2 is a schematic cross-section of another example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 10 might also include an augmentor section 12 and exhaust duct section 14 among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architectures such as turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between a high pressure turbine ("HPT") and a low pressure turbine ("LPT").

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44 then the HPC 52, mixed with the fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing structures 38 within the static structure 36. It should be understood that various bearing structures 38 at various locations may alternatively or additionally be provided.

The HPC 52 includes a multiple of stages with alternate stationary vane arrays 60 and rotational rotor assemblies 62 along an airflow passage 64. Although the HPC 52 is illustrated in the disclosed non-limiting embodiment, other engine sections will also benefit herefrom. Moreover, although a particular number of stages are illustrated, it should be appreciated that any number of stages will benefit herefrom.

Figure 3:
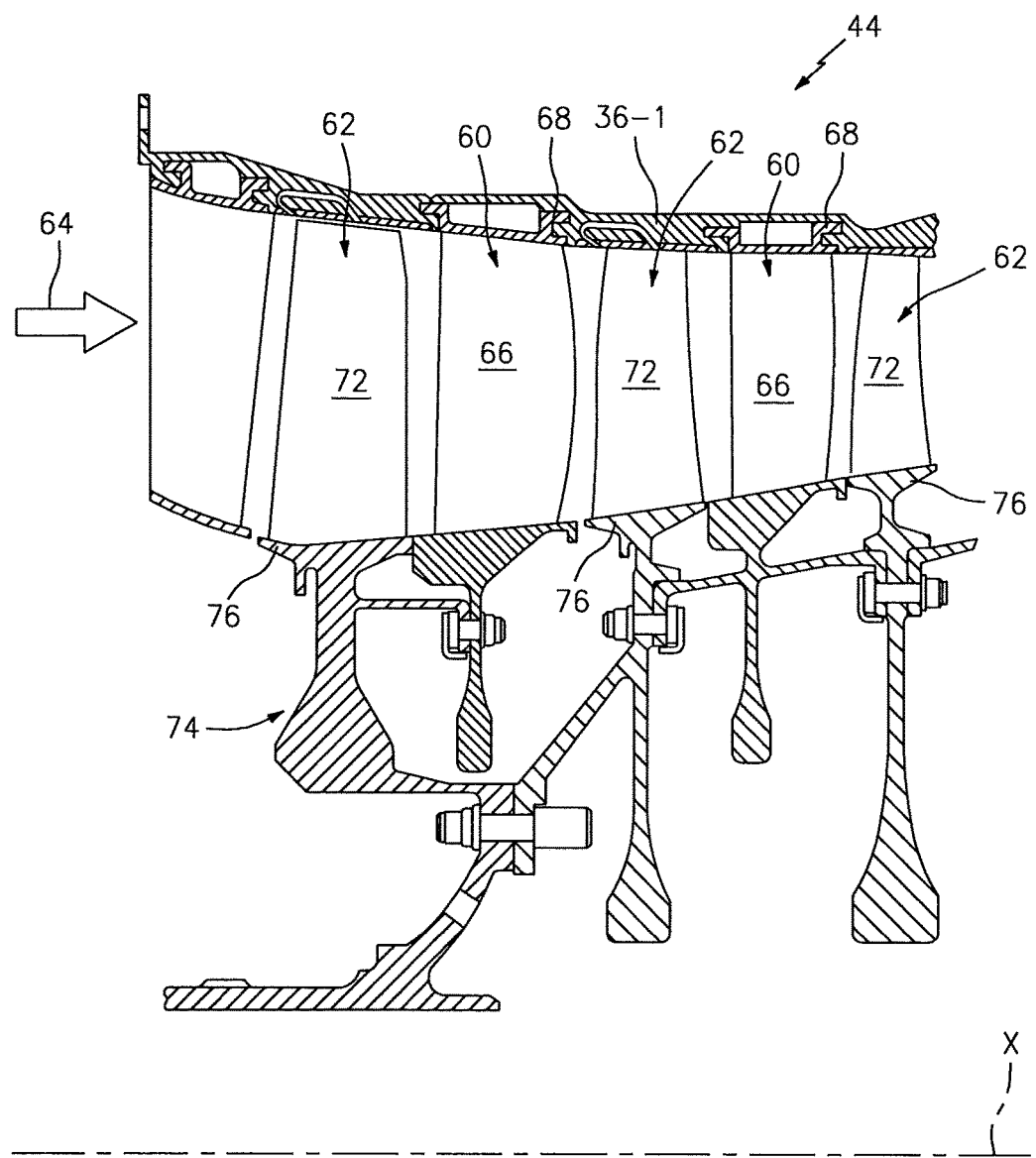
FIG. 3 is a schematic expanded cross-section of a portion of an engine case with a multiple of cantilevered mounted stator vane airfoils of a multiple of vane clusters.
Figure 4:
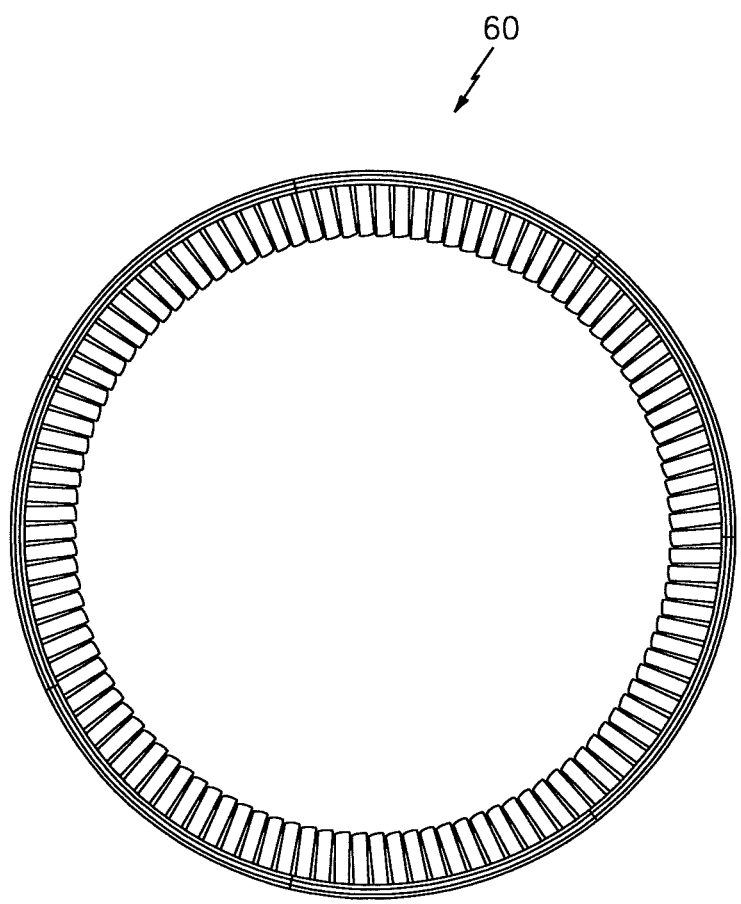
FIG. 4 is a front view of a vane array with a multiple of cantilevered mounted stator vane airfoils of a multiple of vane clusters.

With reference to FIG. 3, each vane array 60 (also shown in FIG. 4) includes a multiple of cantilevered mounted stator vane airfoils 66 that extend in a cantilever manner from a platform 68 toward the engine central longitudinal axis X. The platform 68 is mounted to the engine static structure 36 such as engine case 36-1 via, for example, segmented hooks or other interfaces. Each vane array 60 may be formed of a multiple of vane clusters 70 (see FIG. 5) each with a multiple of cantilevered mounted stator vane airfoils 66. It should be understood that various numbers of cantilevered mounted stator vane airfoils 66 and vane clusters 70 will benefit herefrom.

Each of the rotor assemblies 62 includes a multiple of blades 72 supported by a respective rotor hub 74. The platform 68 and airfoils 66 of the vane arrays 60 and a platform 76 that extends from each of the multiple of blades 72 generally bounds the airflow passage 64. The multiple of cantilevered mounted stator vane airfoils 66 extend in a cantilever manner from the engine case 36-1 such that the cantilevered mounted stator vane airfoils 66 extend toward the engine axis X to be disposed in close proximity to the hub 74. Provision for close clearances between the cantilevered mounted stator vane airfoils 66 and the rotor hub 74 increases engine efficiency.

Figure 5:
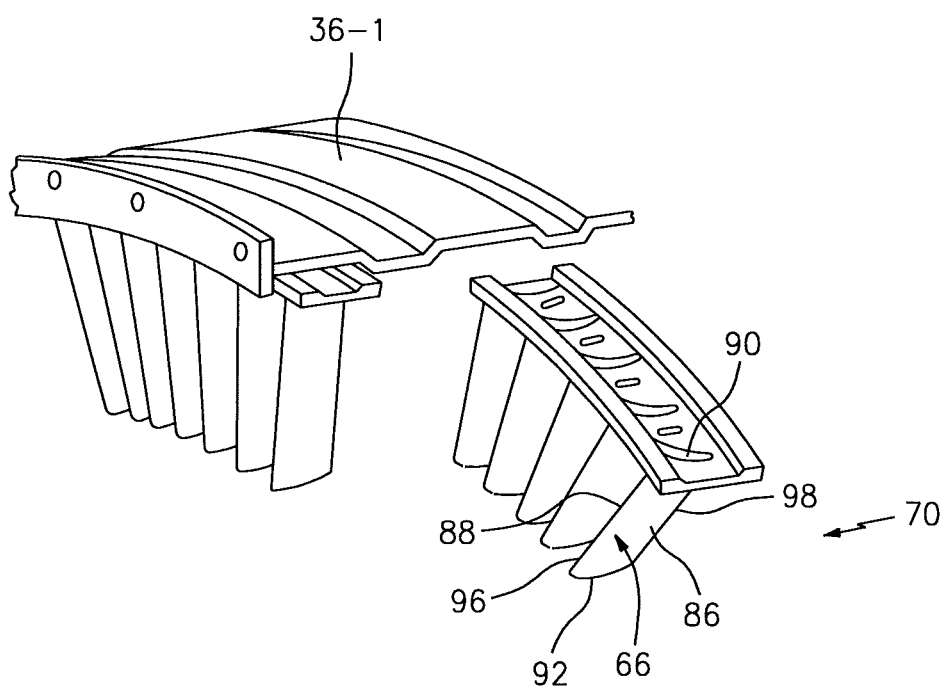
FIG. 5 is a perspective, partially exploded view of a vane cluster.

With reference to FIG. 5, each cantilevered mounted stator vane airfoil 66 includes a first sidewall 86 that may be convex and defines a suction side, and a second sidewall 88 that may be concave and defines a pressure side of the cantilevered mounted stator vane airfoils 66. Sidewalls 86, 88 are joined at a leading edge 96 and at an axially spaced trailing edge 98. More specifically, the airfoil trailing edge 98 is spaced chordwise and downstream from the airfoil leading edge 96. The sidewall 86 and the sidewall 88, respectively, extend longitudinally or radially outward in span from an airfoil root 90 to a tip 92. Each vane cluster 70 may be manufactured from a metallic alloy such as, but not limited to, titanium or a composite material.

In one disclosed non-limiting embodiment, the vane cluster 70 is manufactured by direct metal laser sintering (DMLS) which is an additive metal fabrication technology sometimes also referred to by the terms selective laser sintering (SLS) or selective laser melting (SLM). The DMLS of vane clusters 70 components are then polished with, for example, a Vibratory Mass Media (VMM) process such as that of Rösler Oberflächentechnik GmbH [http://www.rosler.com]. It should be appreciated that although a vane cluster 70 is illustrated in the disclosed non-limiting embodiment, other components such as blades that are to be fine polished will also benefit herefrom.

Figure 6:
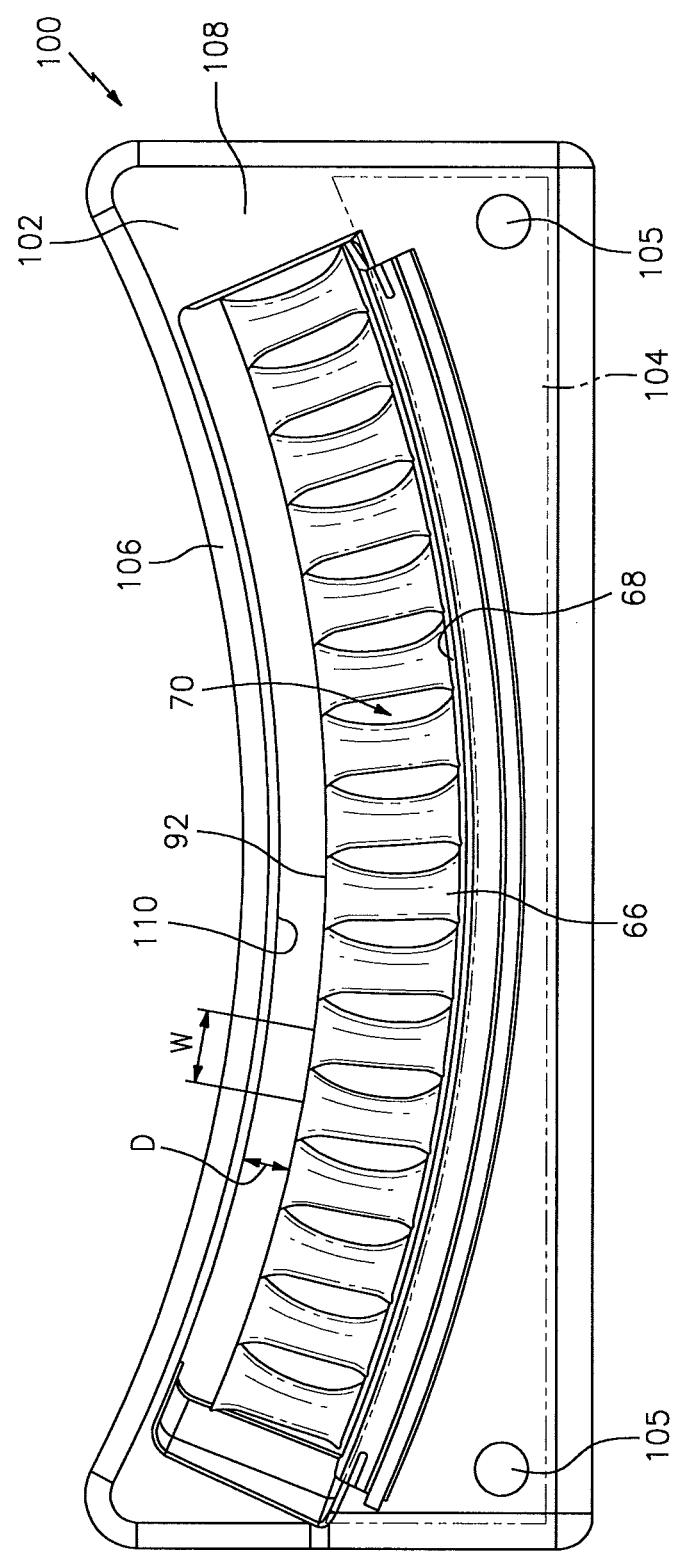
FIG. 6 is a front view of a vibratory mass media process fixture assembly.

With reference to FIG. 6, each vane cluster 70 is mounted within a fixture assembly 100 for use with the example VMM process. Although a particular fixture configuration is illustrated it should be appreciated that other fixture geometries will benefit herefrom.

Figure 7:
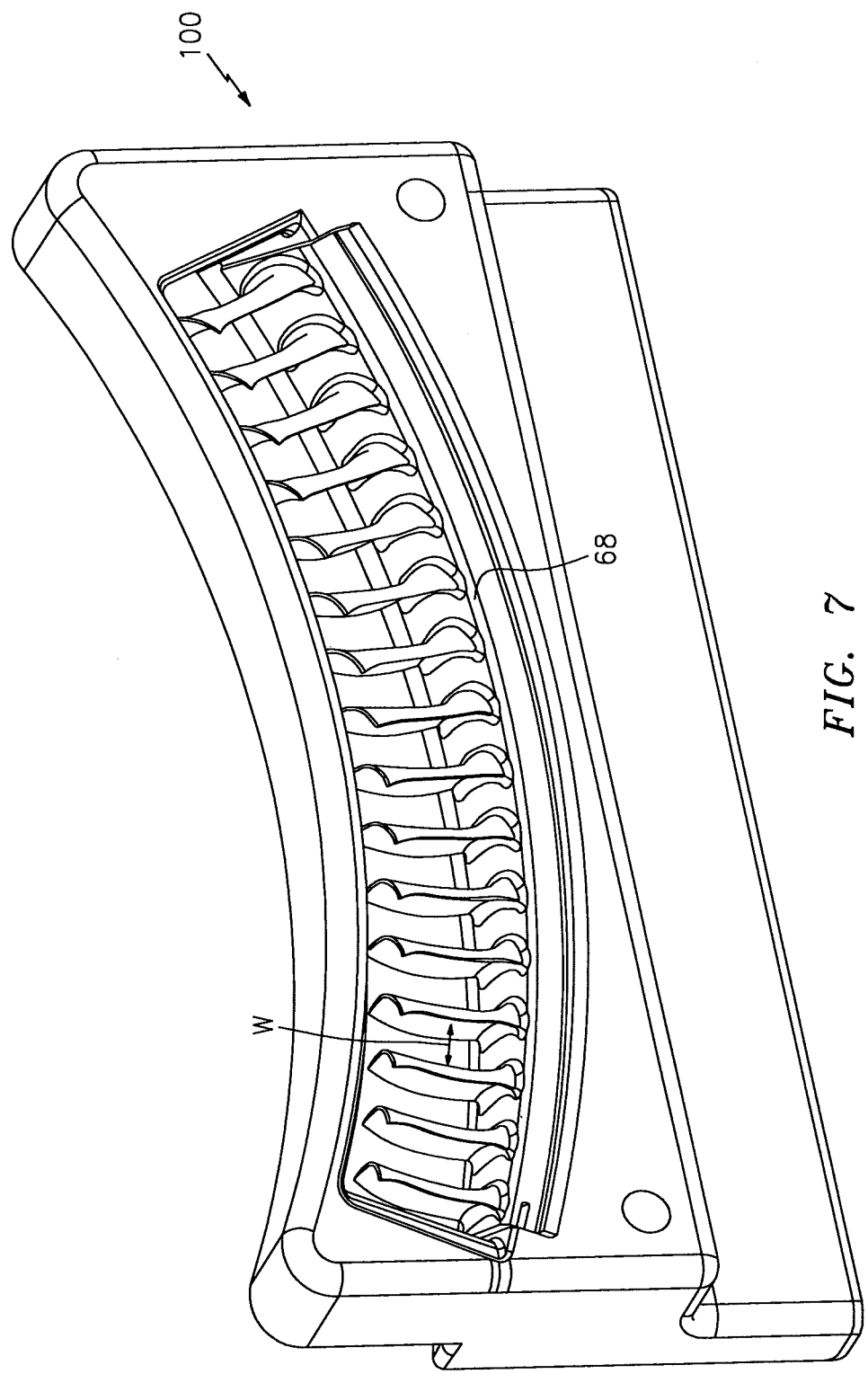
FIG. 7 is a perspective view of a vibratory mass media process fixture assembly.

The fixture assembly 100 generally includes a frame 102 to which is attached a lock plate 104 which retains the vane cluster 70 thereto. The frame 102 includes a tip rail 106 displaced from a main body 108 of the frame 102. The main body 108 is configured to receive the platform 68 generally as mounted to the engine static structure 36 and retained to the frame 102 by the lock plate 104 with fasteners 105 (also shown in FIG. 7).

The tip rail 106 is adjacent to the tip 92 of each of the airfoils 66 of the vane cluster 70. The tip rail 106 is generally arcuate and displaced a predetermined distance D from each tip 92 that is equal to a distance W between each of the airfoils 66 to assure even abrasive wear on the airfoil sidewalls 86, 88 and the tips 92. That is, the distance W between the first sidewall 86 of one airfoil 66 the suction side—and the second sidewall 88 of an adjacent airfoil 66 the pressure side is equivalent to the distance D from the tips 92 to an inner surface 110 of the tip rail 106.

The tip rail 106 restricts the flow of the media of the example VMM process along the airfoil sidewalls 86, 88 and tips 92. Edge radii of the tips 92, for example, are thereby maintained to desired specifications.

The fixture assembly 100 masks the portions of the vane cluster 70 that do not require contact with the media of the example VMM process. The fixture assembly 100 may be manufactured of a glass-impregnated nylon in an additive manufacturing system to facilitate manufacture of the relatively complex three-dimensional geometry.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A fixture assembly for a vibratory mass media process, the assembly comprising:
    a frame with a tip rail displaced from a main body,
    wherein the tip rail is defined a predetermined distance from a tip of a component retained by the main body, and
    wherein the predetermined distance is about equal to a distance between each of a multiple of airfoils of the component.

2. The assembly as recited in claim 1, wherein the tip rail is arcuate.

3. The assembly as recited in claim 1, further comprising a lock plate mountable to the main body to retain the component.

4. The assembly as recited in claim 3, wherein the component is a vane cluster with the multiple of airfoils.

5. The assembly as recited in claim 1, wherein the component is a vane cluster.

6. A method of polishing a gas turbine engine component, the method comprising:
    restricting a flow of media adjacent to a tip of a component with an airfoil to be generally equal to a flow of media adjacent to a sidewall of the airfoil; and
    locating a tip rail a predetermined distance from the tip of the airfoil,
    wherein the predetermined distance is about equal to a distance between each of a multiple of airfoils of the component.

7. The method as recited in claim 6, further comprising utilizing a Vibratory Mass Media (VMM) process for polishing of the gas turbine engine component.

8. The method as recited in claim 6, further comprising removably mounting the component to a main body of a frame with the tip rail.

9. The method as recited in claim 8, further comprising enclosing a platform of the component.

10. The method as recited in claim 9, further comprising positioning the tip rail relative to the multiple of airfoils which extend from the platform of the component a distance about equal to a distance between each of the multiple of airfoils.

* * * * *